Jan. 20, 1970     KICHITARO ICHIKAWA     3,490,724
THREE-LEGGED STAND
Filed Aug. 5, 1968                                      2 Sheets-Sheet 1
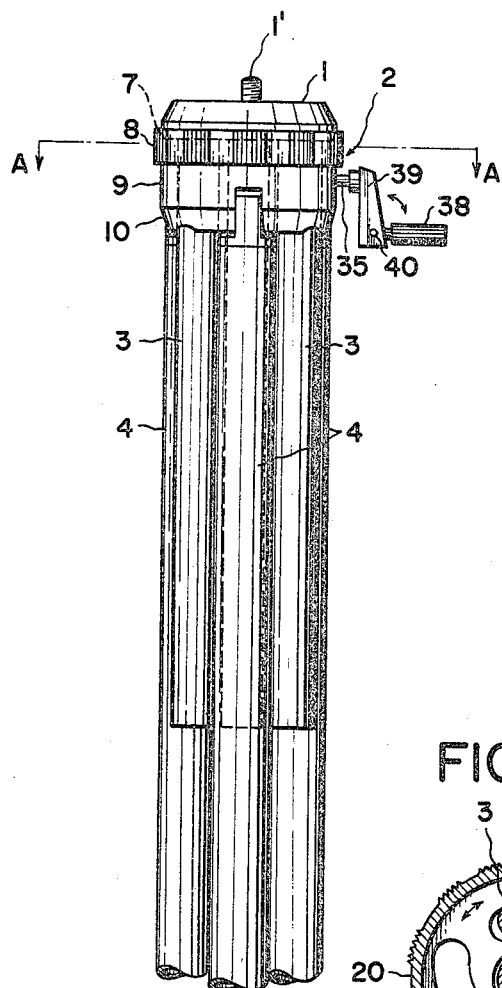
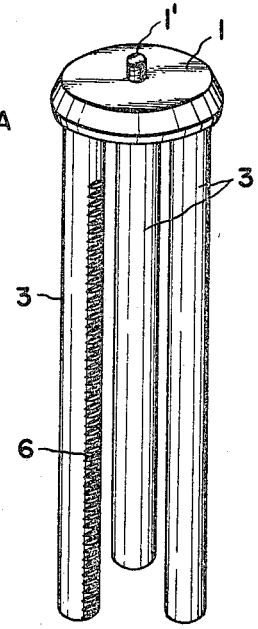
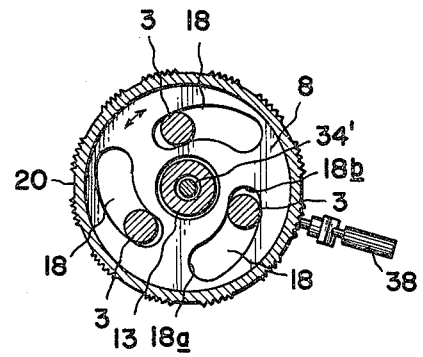
INVENTOR.
Kichitaro Ichikawa
BY
Attorney Jan. 20, 1970    KICHITARO ICHIKAWA    3,490,724
THREE-LEGGED STAND
Filed Aug. 5, 1968    2 Sheets-Sheet 2
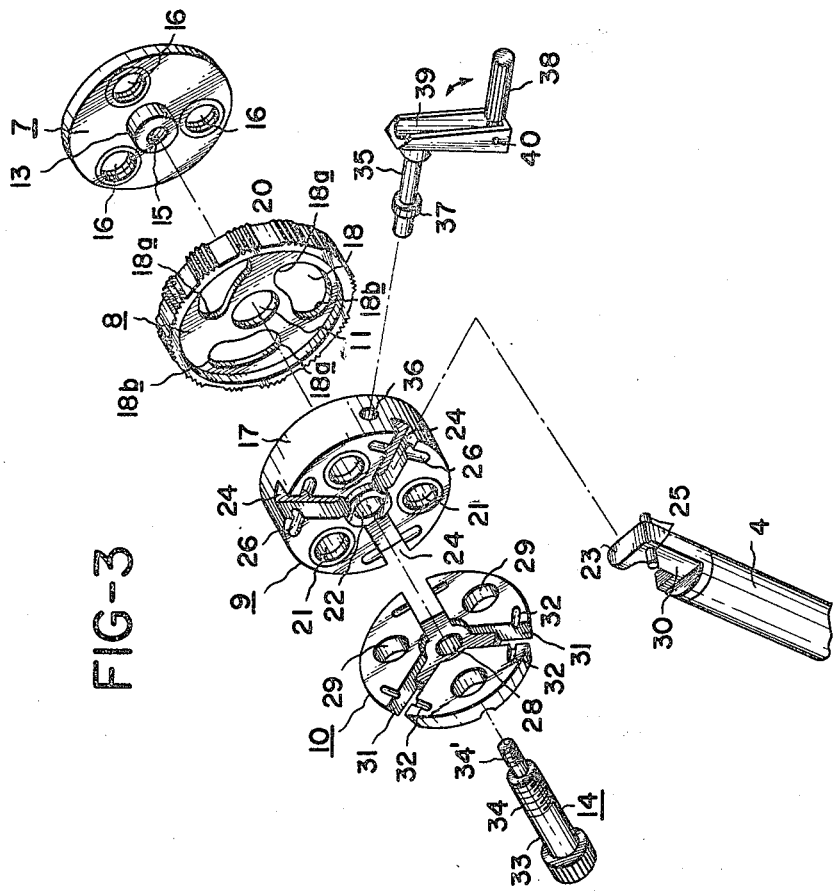
INVENTOR.
Kichitaro Ichikawa
BY Jeanette Montague
Attorney

United States Patent Office 3,490,724
Patented Jan. 20, 1970

3,490,724
THREE-LEGGED STAND
Kichitaro Ichikawa, 23-go, 22-ban, 2-chome,
Higashinakano, Nakano-ku, Tokyo-to, Japan
Filed Aug. 5, 1968, Ser. No. 750,130
Claims priority, application Japan, Sept. 1, 1967,
42/74,503
Int. Cl. F16m 11/04
U.S. Cl. 248—178      5 Claims

ABSTRACT OF THE DISCLOSURE

A main body, which has circumferentially spaced three legs depending downwardly therefrom, is provided with circumferentially spaced three openings which are each arranged in such an angular relation with the legs that the opening is positioned between any adjacent legs of said three legs. A locking cam ring is assembled to the main body for relative rotation to the same, with said locking cam ring being provided with three of elongated slots which are arranged in the axially aligned relation to the openings of the main body, and with the elongated three slots each extending radially outwardly of the ring as it advances along its longitudinal axis from one of its opposed extremities toward the other. The three rods extending downwardly from a table having detachably mounted thereon a portable instrument are slidably passing through the openings of the main body and the elongated slots of the cam ring. The rods are raised and lowered to adjust the height of said instrument and then the locking cam ring is rotated to lock the rods against the vertical movement whereby the instrument mounted on the table is maintained at the required height.

---

The present invention relates to a three-legged stand for supporting a portable instrument such as a camera, a transit, a field-glass and the like at a desired height, more particularly, relates to an improvement of such type in which a table or head having detachably mounted thereon a portable instrument is supported on a main body having three legs in such a manner that the table may be vertically moved relative to the main body and also locked at the required height against the vertical movement.

Three-legged stands of such type to which the present invention relates has been heretofore known in the art, which comprises a rod or rods having supported thereon a table or head, said rod or rods being mounted in a three-legged main body for the up and down movement, an operating mechanism for vertically moving the rod or rods with the table with respect to the main body and a locking mechanism for holding the rod or rods at a desired height. However, such conventional three-legged stands had several disadvantages such that, when only one rod has supported thereon the table, the stands become compact in entire volume or structure but very serious problems arise in connection with the mechanical strength sufficient to suffer the weight of the instrument to be supported with stability, on the other hand, when several rods, usually three rods, are employed to support thereon the table, the stands are sufficient in their mechanical strength but extremely bulky or unwieldly. Such conventional stands, further, are complicated and difficult in the operation of the mechanism for locking or fixing the rod or rods against the up and down movement.

An object of the present invention is to provide an improved three-legged stand of the aforementioned type which has three rods for supporting thereon a table to meet the required mechanical strength and stability, and also is considerably reduced in entire volume or structure.

Another object of the present invention is to provide an improved locking mechanism which is simple in structure and convenient in operation for locking or holding the table-supporting rods at the desired height against the vertical movement with respect to the main body having three legs.

Yet another object of the present invention is to provide means which is easy to drive the table supporting rods along the vertical direction.

A further object of the present invention is to provide a locking mechanism consisting of a locking cam ring which has three elongated slots spaced to each other circumferentially of the ring so as to guide the three rods therethrough, with said elongated slots being each extended radially outwardly of the ring as it advances along its longitudinal axis from one of its opposed extremities toward the other.

Another object of the present invention is to provide a three-legged stand in which the three rods to support thereon the table are arranged in such angular relation with the three legs that the rods are each located between any adjacent legs so that the stand will become compact insofar as possible.

Other and further objects of the present invention will be apparent from the following description and claims and are illustrated in the accompanying drawings, which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art.

In the drawings:

FIG. 1 is a front elevational view of a completely assembled three-legged stand embodying the principles of the present invention;

FIG. 2 is a perspective view showing a small table or head to mount thereon a portable instrument such as a camera, and three rods extending downwardly from the table;

FIG. 3 is an exploded isomeric view illustrating a mechanism to move vertically and then lock at a desired height the table or head shown in FIG. 2; and FIG. 4 is a diagrammatic view, taken along the line A—A in FIG. 1, showing the function of a locking cam ring employed in the present invention.

Now referring to FIGS. 1 and 2, in accordance with the present invention, a three-legged stand to support a portable instrument as a camera at a desired height comprises a small circular table or head 1 to mount thereon the portable instrument, circumferentially spaced three rods 3 having attached to the lower surface of the table 1 and depending downwardly therefrom, a mechanism 2 to drive vertically the table 1 together with the three rods 3 and lock them at the desired height against the vertical movement, and circumferentially spaced three legs 4 fixed pivotally to the bottom of the mechanism 2 and extended downwardly therefrom. The legs 4 are usually constructed in a telescopic manner. The circumferentially spaced three rods 3 are each arranged in such angular relation with legs 4 that the former is positioned between any adjacent legs of the circumferentially spaced legs 4. The table or head 1 is provided at the upper center thereof with an externally threaded vertical pin 1' on which is threadedly fitted an internally threaded counterbore provided in the bottom of the instrument such as a camera. Any one of the circumferentially spaced rods 3 has on its side surface a longitudinally extending rack 6, the function of which will be hereinafter described.

With reference to FIG. 3 in which is the mechanism 2 to move vertically the table 1 with the rods 3 and lock them at the desired height against their vertical movement. The mechanism 2, in general, consists of a retainer plate 7, a locking cam ring 8, a main body 9, a bottom member 10 and an assembly screw 14. The retainer plate 7 is to maintain the locking cam ring, located immediately below it, at the required assembling position and also to support the table or head 1 immediately above it in a normal situation as shown in FIG. 1. The retainer plate 7, further, has at its center a hub portion 13 having a coaxial aperture 15 and also has circumferentially spaced three openings 16 which would receive axially slidably therein the guide rods 3, respectively. The locking cam ring 8 is disposed immediately below the retainer plate 7 so as to be rotated relatively to the latter, with the cam ring 8 having at its center a central aperture 11 in which may be loosely fitted the hub portion 13 of the retainer plate 7 and also having on its periphery a cylindrical flange 20 both annular edges of which are extending axially beyond the upper and lower surfaces of the cam ring, respectively, so that the flange 20 may partially surround the retainer plate 7 and the main body 9. The flange 20 is knurled on its outer peripheral surface to facilitate the angular movement of the cam ring 8. The locking cam ring 8, further, is provided with three of substantially elongated slots 18 which are circumferentially spaced and positioned in axially aligned relation with the openings 16 of the retainer plate 7 to guide slidably the rods 3 therethrough along their axial direction. In addition, the elongated slots 18 each extends radially outwardly with slight curvature as it advances, circumferentially of the cam ring 8, from one extremity 18a toward opposed extremity 18b. It will be thus apparent that the elongated slots 18 are each shaped like the ellipse or saddle with its longitudinal or major axis intersecting with the imaginary circular line which is coaxial to the locking cam ring 8 and includes therein the axial line of the rods 3. The main body 9, which should be disposed immediately below the locking cam ring 8, is assembled to the cam ring 8 with its periphery being loosely fitted in the cylindrical flange 20. It will be thus apparent that the cam ring 8 may be rotated relatively to the main body 9. This main body 9 is of an upwardly opened cup-shaped member, the bottom of which is provided at the center thereof with an internally threaded aperture 22 which is aligned axially to and is larger in diameter than the center aperture 15 of the retainer plate 13. The bottom portion of the main body 9 has circumferentially spaced three openings 21 in axially aligned relation with the guide openings 16 of the retainer plate 7.

The bottom portion of the main body 9, moreover, is provided on its lowest surface with three of radially extending channels or grooves 24, each of which is positioned between any adjacent openings 21. It will be understood from FIG. 3 that the channels or grooves 24 each has an inner end terminating at the proximity of the center aperture 21 and also an outer end opening on the peripheral surface of the body 9. The channels or grooves 24 each has a pair of recessed portions 26 which are extended, in perpendicular to the channel 24, in opposite directions from both side walls of the channel 24, respectively. It will be understood by those skilled in the art that the channel and the recessed portions perpendicular thereto are substantially conforming to a tongue 23 of a L-shaped neck 30 extending upwardly from the leg 4, and a pair of pins 25 protruding laterally from the neck 30.

Next, the bottom covering member 10, which should be mounted immediately below the main member 9, is provided a center aperture 28 and circumferentially spaced three openings 29, each of which openings is axially aligned to the above-mentioned openings 16 of the retainer plate 7 and the openings 21 of the main body 9. The bottom covering member 10, further, has radially extending notches 31 which are each located at a position corresponding to the respective channel or groove 24 on the main body 9 to receive loosely therein the neck 30 of the leg 4. Opposed recesses 32 and 32 are provided, one in each side wall of each notch 31, on the upper surface of the bottom covering member 10. The opposed recesses 32 will co-operate with the recessed portion 26 of the main body 9 to provide bearing means for supporting pivotally a pair of pins 25 and 25 of the leg 4 when being assembled as shown in FIG. 1.

In the cylindrical side wall of the main body 9 is bored a lateral hole 36 through which is passing a rotating shaft 35 having on its innermost end a pinion 37 which is meshed with the rack 6 cut on one of rods 3. The rotating shaft 35 has on its outermost end a crank 39 extending in perpendicular to the shaft. The crank 39 has its opposite end connected pivotally to a handle 38. It will be thus apparent that, when the rotating shaft 35 is manually driven by gripping the handle, the pinion 37 is driven to move vertically the rods 3 together with the table or head 1 in the required direction. It is preferred that the crank 39 is, as shown in FIG. 3, formed with a L-shaped member to fold the handle 38 up in the crank 39 in no use.

Finally, the assembly screw 14 is to retain or keep the retainer plate 7, the locking cam ring 8, the main body 9 and the bottom covering member 10 in assembled relation as shown in FIG. 1 with their circumferentially spaced openings 16, 18, 21 and 29 being kept in axially aligned relationship. The assembly screw 14 has a stepped stem 33 consisting of an externally threaded upper section of reduced diameter adapted to threadingly engage with the internally threaded center aperture 15 in the retainer plate 7, and an externally threaded lower section of enlarged diameter adapted to engage with the internally threaded aperture 22 in the main body 9.

The operation of the present three-legged stand having the structure as described herein in detail is as follows. To use the present three-legged stand, this is at first set on the earth with its three legs 3 being flared radially outwardly, after the portable instrument as a camera has been mounted on the table or head 1. The locking cam ring 8, then, is manually rotated to bring itself in the unlocking position, as shown in FIG. 4, where all of the three rods 3 supporting the table 1 may be permitted to move freely vertically along their axes. The pinion 37 is driven from the handle 38 through the rotating shaft 35 and the crank 39 so that the rack 6 meshed with the pinion 37 is advanced upwardly whereby the three rods 3 is guided by the openings 29, 21, 18 and 16, and raised and lowered relative to the mechanism 2 and legs 4 until the camera on the table 1 reaches the required height. The rotation of the pinion 37, on this status, is brought to a sandstill and then the locking cam ring 8 is reversely rotated to the locking position. Thus, since the cam ring 8 has the elongated, curved slots 18 which are each extended radially outwardly of the cam ring 8 as it advances along the circumferential direction of the cam ring 8 as described hereinbefore, the three rods 3 which are slidably passing through the slots 3, respectively, will be resiliently biased or deflected, at the only section engaged with the slot, radially outwardly of the cam ring 8 by the guiding action of the elongated slots 18 as the cam ring 8 rotates. It will be thus understood that, when the locking cam ring 8 has been brought into the locking position, the rods 3 should be locked or fixed against the vertical movement by the face-to-face friction engagement of the deflected rod sections and the slot walls, with the friction engagement resulting from restoring force of the deflected rod section. The deflection of the rod 3, of course, should be within the allowable elastic limit of rod material.

Thus, I have illustrated and described the preferred embodiment of my invention, it will be understood that this is capable of variation and modification.

What is claimed is:

1. A three-legged stand for supporting a portable instrument and comprising a table to mount thereon said instrument, said table having on the lowest surface thereof circumferentially spaced three rods depending downwardly therefrom, a main body provided with circumferentially spaced three openings to guide said rods along their axial direction, said main body having circumferentially spaced three legs, a locking cam ring assembled to said main body in such a manner that the former may be rotated freely with respect to the latter, said cam ring being provided with three of elongated slots which are circumferentially spaced and arranged in axially aligned relation with said openings in said main body, said elongated slots each extending radially outwardly of said ring as it advances along its longitudinal axis from one of its opposed extremities toward the other, and an assembly screw for assembling said main body and said cam ring to each other with their center axes being maintained in an axially aligned relationship.

2. A three-legged stand according to claim 1 wherein said elongated slots each extends radially outwardly of said cam ring with curvature as it advances along its longitudinal axis from one of its opposed extremities toward the other.

3. A three-legged stand according to claim 1 wherein a retainer plate is positioned on said cam ring and assembled to the same in such a manner that said cam ring may be freely rotated with respect to the retainer plate, said retainer plate being provided with circumferentially spaced three openings each of which is located at a position aligned axially to the openings in said main body to guide each rod therethrough, and said retainer plate having at its center a center aperture to receive therein said assembly screw.

4. A three-legged stand according to claim 1 wherein said circumferentially spaced three openings in said main body to guide three rods depending downwardly from said table are each arranged in such angular relation with said legs that the opening is positioned between any adjacent legs of said three legs.

5. A three-legged stand according to claim 1 wherein said main body is of an upwardly open cup provided in the annular side wall thereof with a lateral hole through which is passing a rotating shaft, a pinion is drivingly connected to the inner end of said rotating shaft, said pinion being operatingly meshed with a rack which is provided on any one of said rods whereby said rods together with the table may be moved vertically by rotation of the pinion.

References Cited

UNITED STATES PATENTS

| | | | |
|---|---|---|---|
| 943,063 | 12/1909 | Cooke | 248—178 |
| 2,591,051 | 4/1952 | Caldwell | 248—177 |
| 2,826,809 | 3/1958 | Lapastora | 248—185 |
| 3,208,711 | 9/1965 | Pagliuso | 248—404 |

MARION PARSONS, Jr., Primary Examiner